United States Patent [19]

Riddle

[11] Patent Number: 5,664,164
[45] Date of Patent: Sep. 2, 1997

[54] SYNCHRONIZATION OF ONE OR MORE DATA STREAMS

[75] Inventor: Guy Gregory Riddle, Los Gatos, Calif.

[73] Assignee: Apple Computer, Inc., Cupertino, Calif.

[21] Appl. No.: 394,089

[22] Filed: Feb. 24, 1995

[51] Int. Cl.[6] ..................................................... G06F 1/14
[52] U.S. Cl. ......................................................... 395/551
[58] Field of Search ................................ 395/550, 650, 395/154, 700, 200.04, 2, 2.2, 2.44, 2.76, 878; 348/500, 508, 510, 512, 515

[56] References Cited

U.S. PATENT DOCUMENTS

| | | | |
|---|---|---|---|
| 4,785,415 | 11/1988 | Karlquist | 395/550 |
| 5,020,023 | 5/1991 | Smith | 395/250 |
| 5,333,299 | 7/1994 | Koval et al. | 395/550 |
| 5,487,167 | 1/1996 | Dinallo et al. | 395/650 |
| 5,506,954 | 4/1996 | Arshi et al. | 395/162 |

Primary Examiner—Thomas M. Heckler
Assistant Examiner—Dennis M. Butler
Attorney, Agent, or Firm—Blakely, Sokoloff, Taylor & Zafman

[57] ABSTRACT

Synchronization of one or more data streams comprising an electronic data connection. The synchronization of one or more data streams having inherent temporal qualities or relationships is maintained on playback so as to retain the value of these temporal relationships established at capture time.

14 Claims, 7 Drawing Sheets

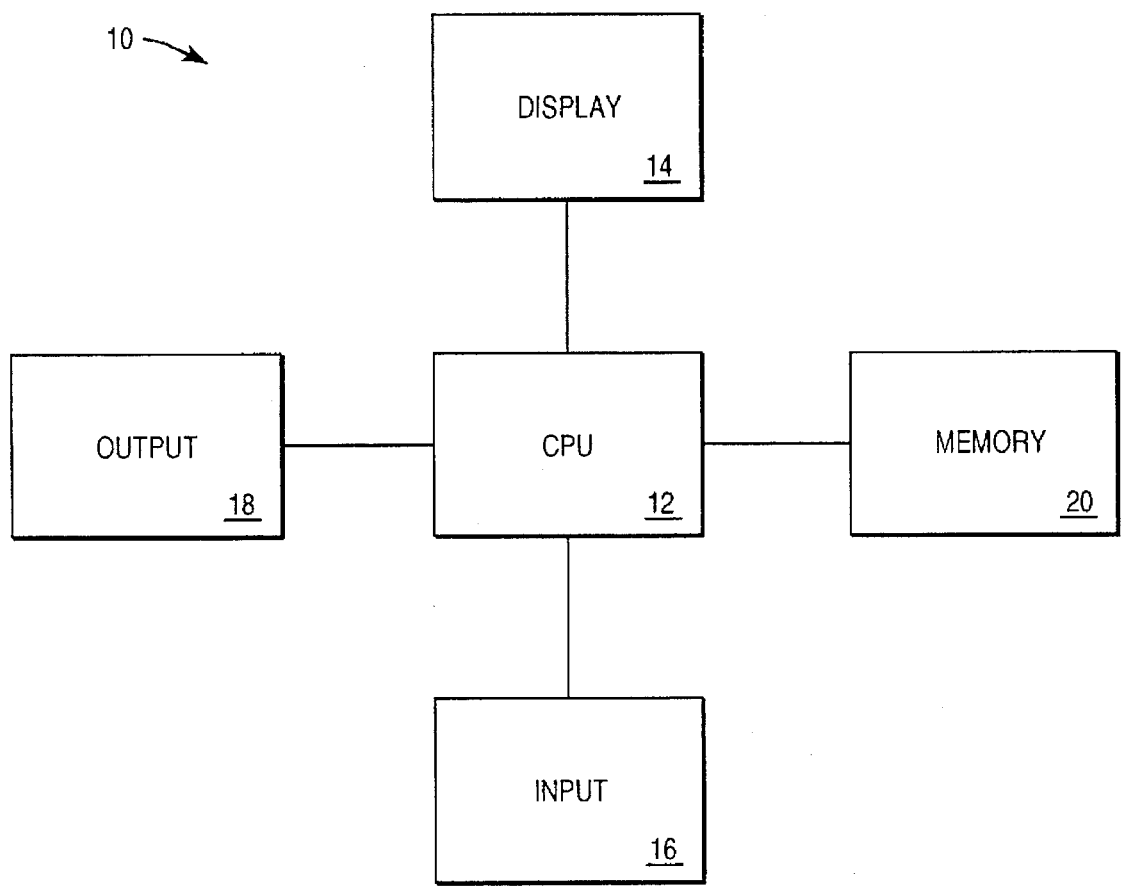
FIG_1

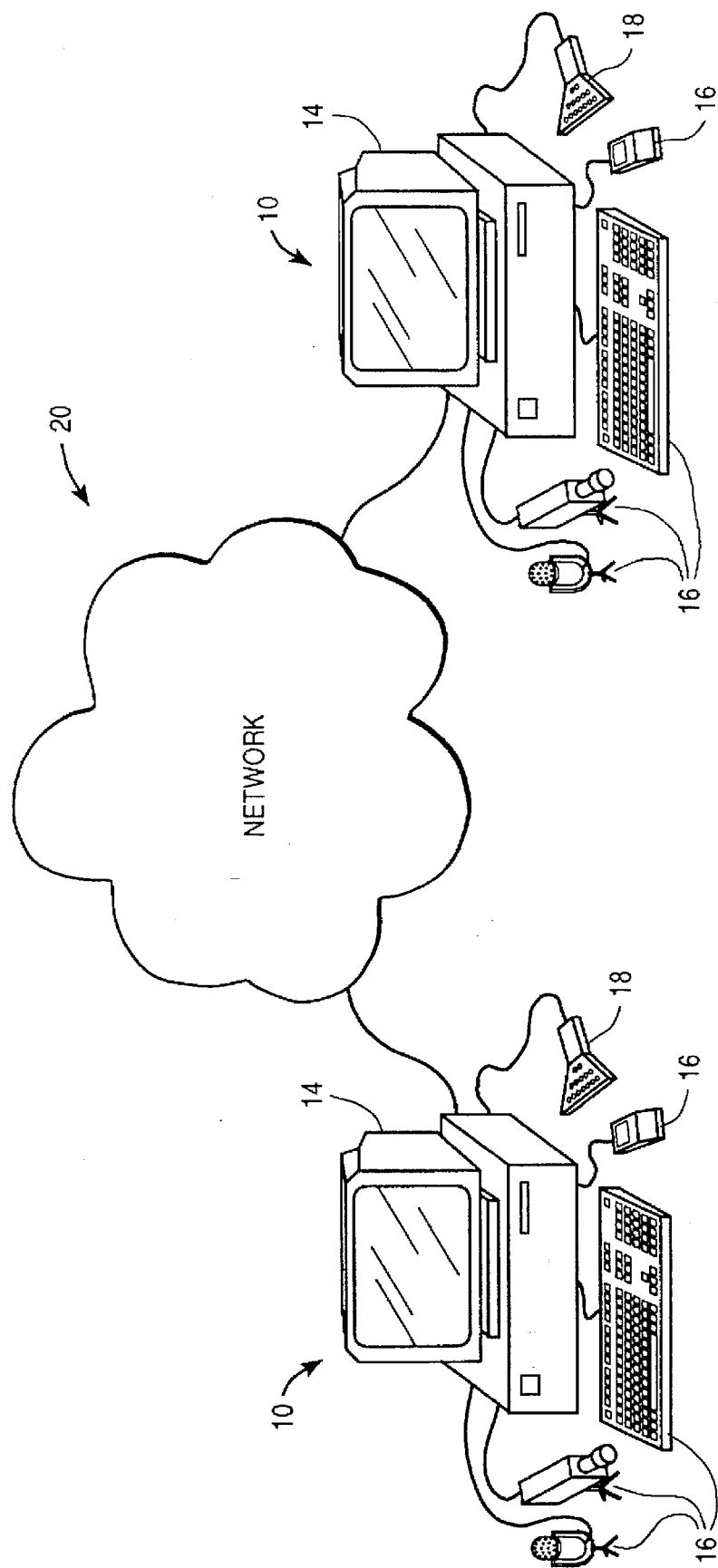
FIG_2

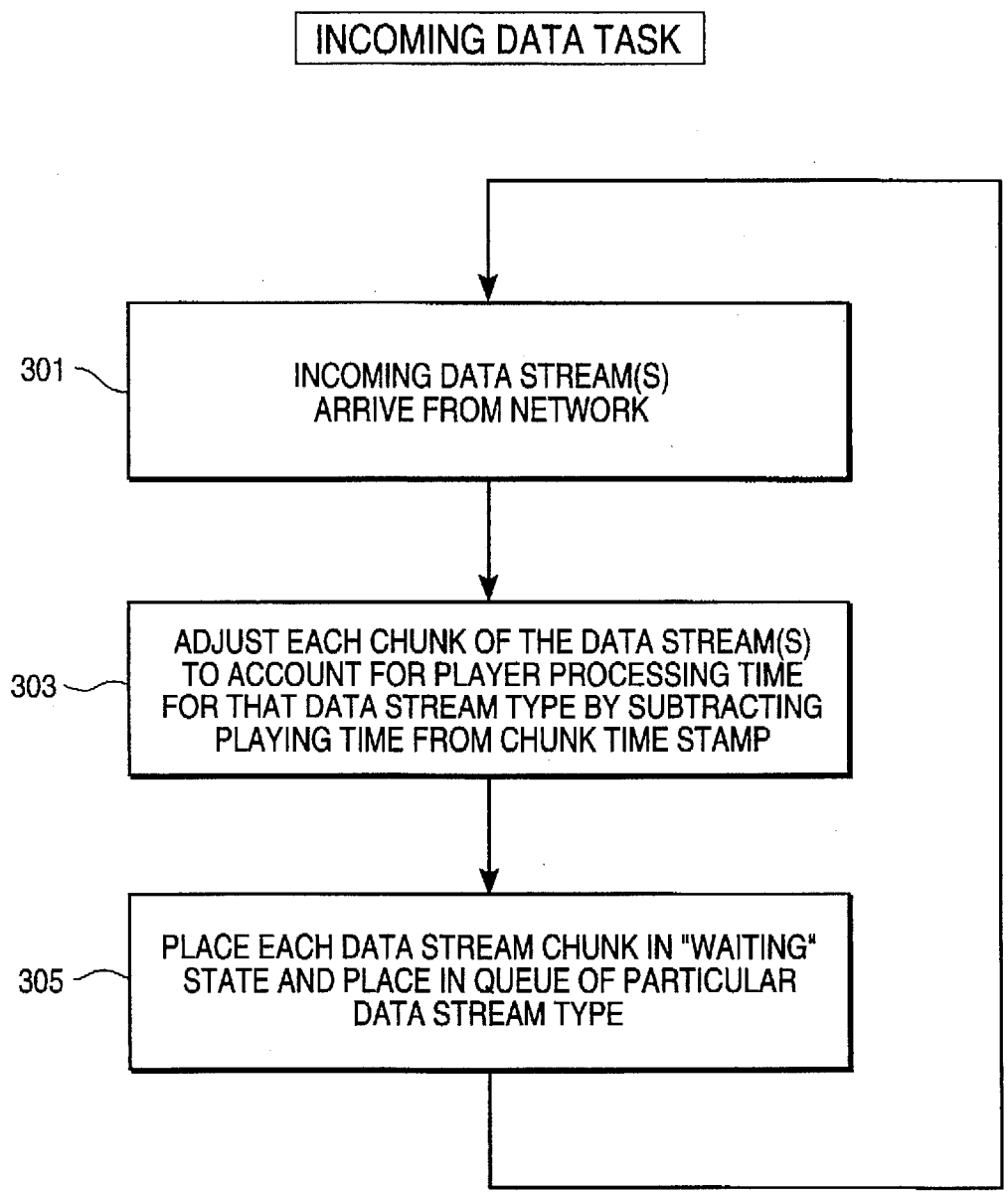
FIG_3

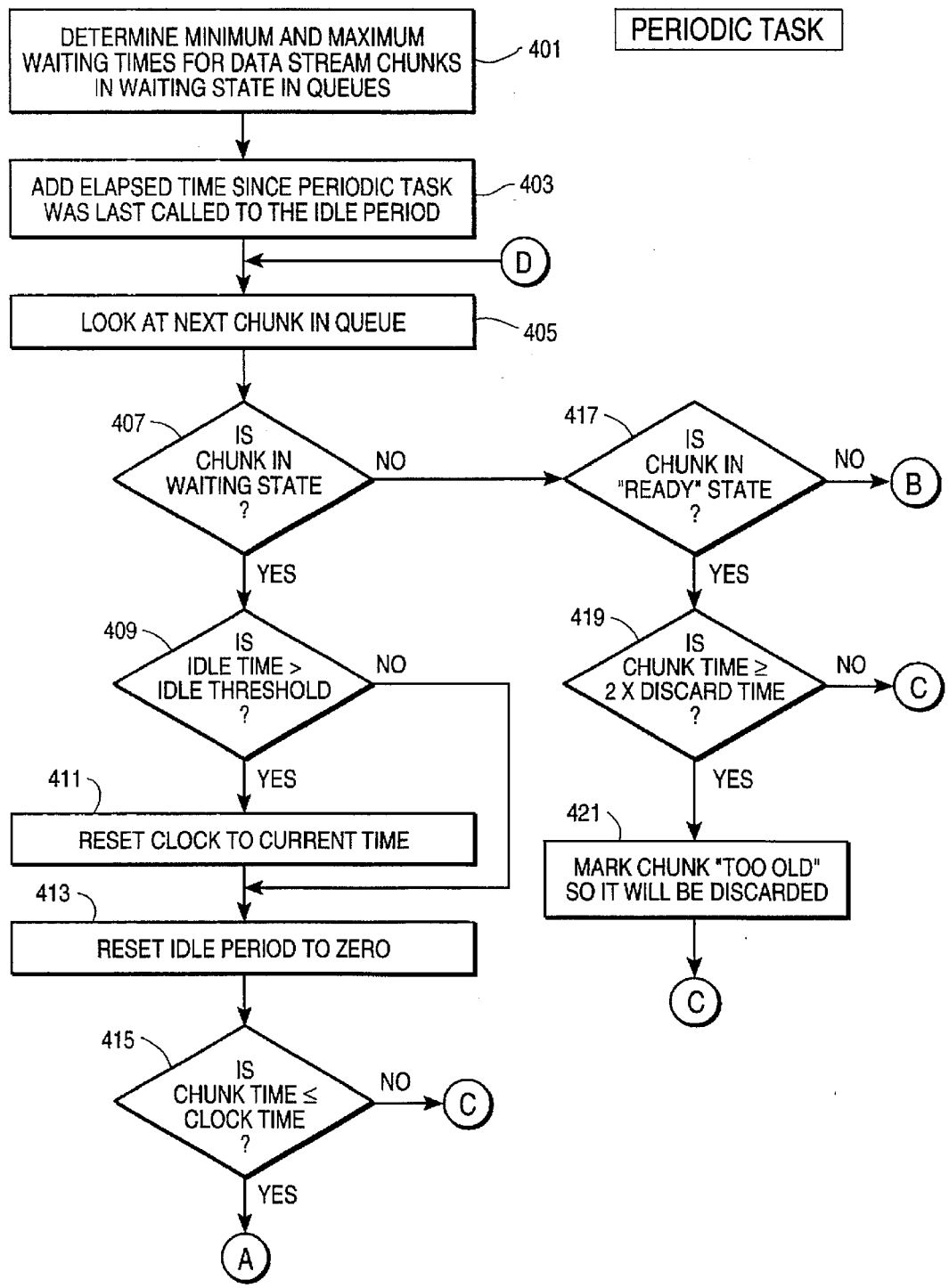
FIG_4

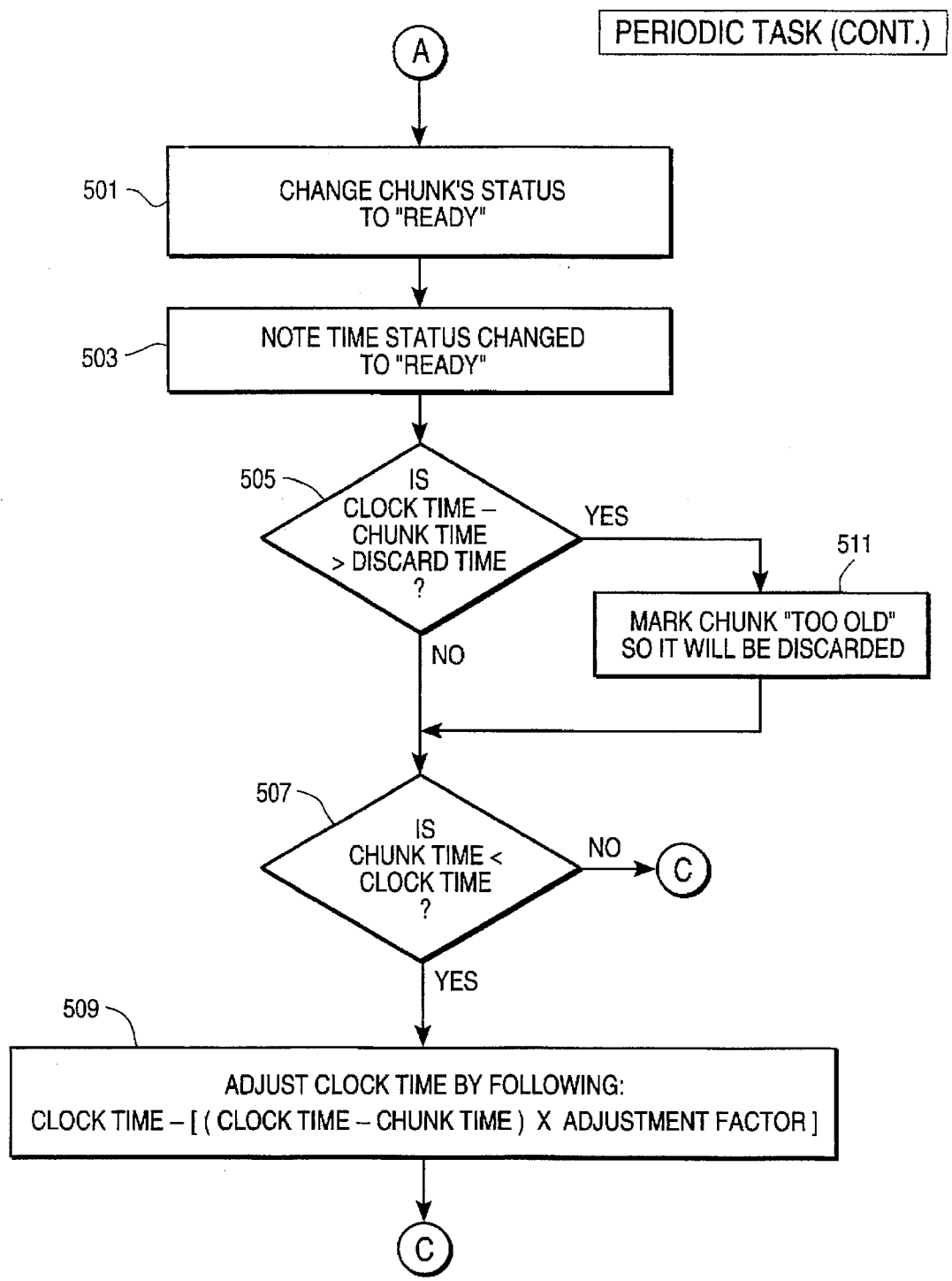
FIG_5

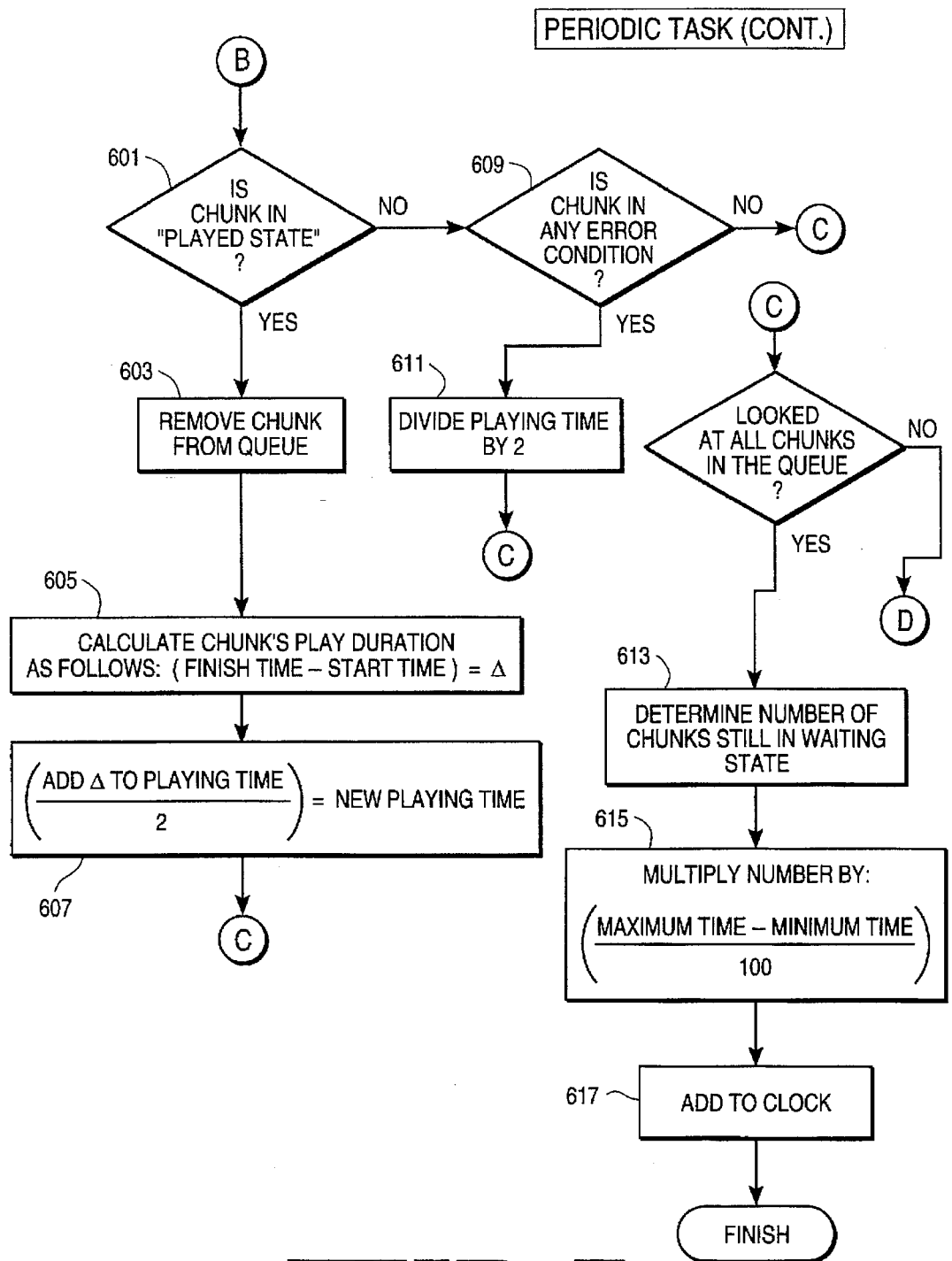
FIG_6

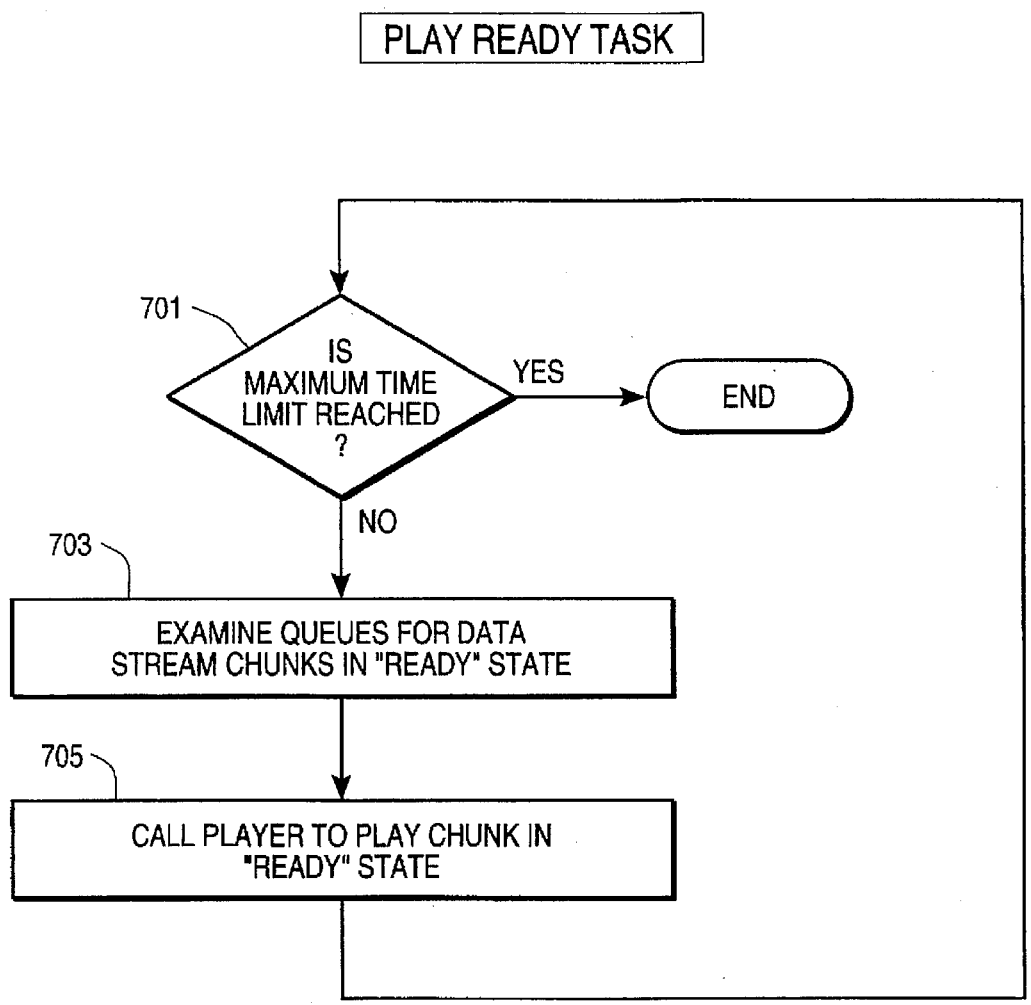
FIG_7

1

SYNCHRONIZATION OF ONE OR MORE DATA STREAMS

FIELD OF THE INVENTION

The present invention relates generally to synchronizing one or more data streams. More specifically, the present invention relates generally to the need to synchronize one or more incoming data streams wherein the one or more data streams have some inherent temporal quality or relationship wherein they are to be played on the receiving side in as similar a manner to their capture on the send side as possible.

BACKGROUND OF THE INVENTION

Connecting a data sender to a data receiver has been accomplished in a variety of ways and in a variety of situations in the past. Simple connections such as a terminal to a host computer require capturing and transmitting data from the terminal to the host. As technology has progressed, multiple data streams have been transmitted across connections such as these. However, in most of these past connections no strict synchronization was needed because there was no temporal quality to the one or more data streams or no temporal relationship between the various data streams that needed to be maintained.

Modern electronics and systems require much greater synchronization of data streams transmitted across a connection due primarily to the type and nature of the connection. For example, modern video telephony involves transmitting both image and sound wherein it is extremely desirable for the image to be synchronized to the sound so that the lips appear to move in accordance with the sound being played. In fact, fast delivery and proper synchronization of these different data streams is oftentimes more important than complete delivery of each data stream. Stated differently, due to the nature of the types of data streams and their common uses, it is not atypical to be more concerned with fast delivery than whether every bit of data arrives and is utilized at the receiving end.

Further, with the advance of modern electronics and computer systems and with the continuing breakthroughs in telecommunications, the range and variety of these various data stream types continues to grow. And with the vagaries of network communications, compression/decompression processing requirements, processor dependent latencies, and differing data stream types being processed differently, synchronization of data streams is becoming more important.

SUMMARY AND OBJECTS OF THE INVENTION

It is an object of the present invention to provide an improved data stream synchronization system.

It is a further object of the present invention to provide an improved data stream synchronization system wherein the synchronization of one or more data streams at data capture time is maintained at playback time.

The foregoing and other advantages are provided by a data stream synchronization method in a computer system comprising a central processing unit, an input unit, and an output unit, said synchronization unit comprising: a) an incoming data task for handling housekeeping chores of incoming data of said data stream to said input unit; b) a periodic task for handling status of said data stream data and for adjusting a clock for said data stream with said central processing unit; and, c) a play ready task for utilizing said data stream data with said output unit.

The foregoing and other advantages are also provided by a data stream synchronization apparatus in a computer system comprising a central processing unit, an input unit, and an output unit, said synchronization unit comprising: a) an incoming data task handler for handling housekeeping chores of incoming data of said data stream to said input unit; b) a periodic task handler for handling status of said data stream data and for adjusting a clock for said data stream with said central processing unit; and, c) a play ready task handler for utilizing said data stream data with said output unit.

Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 1 is a simplified block diagram of a computer system as may be utilized by the present invention;

FIG. 2 is a simplified block diagram of multiple computer systems coupled via a network as may be utilized by the present invention;

FIG. 3 is a flow diagram of the Incoming Data Task of the present invention;

FIG. 4 is a flow diagram of a portion of the Periodic Task of the present invention;

FIG. 5 is a flow diagram of another portion of the Periodic Task of the present invention;

FIG. 6 is a flow diagram of still another portion of the Periodic Task of the present invention; and FIG. 7 is a flow diagram of the Play Ready Task of the present invention.

DETAILED DESCRIPTION OF THE INVENTION

The present invention will be described below by way of a preferred embodiment as an improvement over prior data stream synchronization approaches, and implemented on an Apple Macintosh® (trademark of Apple Computer, Inc.) computer system. It is to be noted, however, that this invention can be implemented on other types of computers and electronic systems. Regardless of the manner in which the present invention is implemented, the basic operation of a computer system 10 embodying the present invention, including the software and electronics which allow it to be performed, can be described with reference to the block diagram of FIG. 1, wherein numeral 12 indicates a central processing unit (CPU) which controls the overall operation of the computer system, numeral 14 indicates a standard display device such as a cathode ray tube (CRT) or liquid crystal display (LCD) screen, numeral 16 indicates a variety of possible input devices which may include both a standard keyboard and a pointer-controlling device such as a mouse as well as a microphone or other sound input device and a video camera or other image input device, numeral 20 indicates a memory device which stores programs according to which the CPU 12 carries out various predefined tasks, and numeral 18 indicates an output device such as a loudspeaker for playing sounds according to the present invention.

Referring now to FIG. 2, a typical environment can be seen in which the present invention can be utilized. Computer system 10, as described with reference to FIG. 1, is shown in a more particularized embodiment wherein input devices 16 are comprised of a microphone, a camera, a keyboard and a mouse, output 18 is comprised of a loudspeaker and wherein display 14 is comprised of a video monitor. Further, computer system 10 is shown coupled to an electronic network 20 typically depicted as an amorphous cloud. Note further that there are two computer systems 10 depicted in the figure thus indicating a typical environment of two or more computer systems 10 coupled together via network 20.

Utilizing network 20 allows computer systems 10 to communicate with each other in a variety of ways. For example, one computer system 10 might wish to transfer a file or document to another computer system 10. Further, one computer system 10 may wish to establish a more real-time connection to another computer system 10. In other words, one computer system 10 may wish to set up a video-conference with another computer system 10 wherein one computer system 10 captures sound and video via inputs 16 which sound and video are to be output on another computer system 10, and vice-versa. Further, a shared window may be displayed on each of the computer systems 10 wherein whatever the user of one computer system enters into the shared window of the display of one computer system is likewise shown in the shared window of the display of another computer system.

The range and variety of transmissions between two or more computer systems 10 is extremely broad but can generally be reduced to the notion of a connection comprised of one or more data streams. Stated differently, an established connection between computer systems can be comprised of one or more data streams where each data stream may be comprised of video (or other image data), sound, shared window data, other data of a particular type, etc. Of course, it is oftentimes important to maintain relationships between the different data streams within a given connection (or, for that matter, between multiple connections). For example, if one data stream is video of a user talking and another data stream is sound of the user talking then it is important on the receive side to play the video and the sound in a synchronized fashion so that the image of the user talking matches the sounds of the user talking. The following describes the present invention's approach to synchronizing one or more data streams.

Referring now to FIG. 3, the Incoming Data Task routine, which is the routine on the receive side which handles the housekeeping of incoming data streams, will now be explained. One or more incoming data streams arrive locally 301 from the network or other form of connection. It is important to note that a data stream is comprised of portions or chunks of data separately acquired by the sending computer system. In other words, each chunk of data represents one portion of data captured by the send side and further, has a time stamp associated with it which indicates when that chunk was captured by the send side.

Next, because each type of data chunk is generally played on the receive side by a different type of data player and because each type of data player generally has a different amount of processing time associated with it, the time stamp of each portion or chunk of a data stream is adjusted to account for the various player processing times 303. This is accomplished by subtracting the particular player's time from that data chunk's time stamp.

Lastly, 305 each data stream chunk is placed in a "waiting" state and placed in the particular queue for that particular data chunk type.

Referring now to FIG. 4, the Periodic Task routine (called once every sixtieth of a second in one embodiment of the present invention), which is the routine on the receive side which manages the status of the various queued data chunks as well as adjusting the clock for the data stream connection as needed, will now be explained. The first step is to determine 401 the minimum time and maximum time of all the data stream chunks in waiting states in the various queues. This determination is made by comparing the time stamps for each chunk waiting in the queues and noting the chunks with the largest and smallest time stamp values. Note that these determinations are used as explained below. Next, 403 the amount of time which has elapsed since the last time the Periodic Task was called is added to the Idle Time period in order to maintain the idle period in better accordance with real time.

The next chunk in the queue(s) is then viewed 405 and is first checked to see if it is in a waiting state 407 in order to determine if it is time to handle that chunk. The idle time is first compared to an idle time threshold and if the idle time is greater than the threshold 409 the clock is reset to the current time 411 in order to more quickly update the clock to the present time. Next, the idle period is set to zero 413. Then the chunk time is compared to the clock and if the chunk time is less than or equal to the clock time (thus indicating it's either time or past time to do something with the chunk), referring now to FIG. 5, the chunk's status is changed to a "ready" state 501 and the time the chunk's status was changed is noted 503 for later use as explained below.

Next, the chunk time is subtracted from the clock time and is compared to a discard time value (five-sixths of a second in one embodiment of the present invention) 505 in order to determine whether the chunk is past due its time to be played. If the difference between the clock time and the chunk time is greater than the discard time the chunk is marked "too old" so that it will be discarded 511. Either way, the chunk time is then compared to the clock time 507 to determine if the clock needs adjusting. Note that the only way to get to this point is if the clock time is greater than or equal to the chunk time (per step 415 of FIG. 4) and if the clock time and the chunk time are equal then the clock time is properly set. Conversely, if the chunk time is less than the clock time then the clock time is too far ahead and will be reset 509 to the current clock time minus the difference between the clock time and chunk time multiplied by an adjustment factor (40% in one embodiment of the present invention).

Referring again to FIG. 4, if the chunk viewed in the queue 405 was not in a waiting state 407 the chunk is then checked for a ready state condition 417 in which case the chunk time is compared to twice a discard time value 419 to ensure that not too much time has elapsed since the chunk was marked ready. If the chunk time is greater than or equal to twice the discard time then the chunk is marked "too old" 421 so that it will be discarded.

If the chunk viewed in the queue 405 was not in a waiting state 407 and not in a ready state 417 then, referring now to FIG. 6, the chunk is checked for a "played" state 601 thus indicating that the chunk has been played and should be flushed from the queues. If the chunk is in a played state 601 then the chunk is removed from the queue 603 as a clean up step and the chunk's play duration is calculated 605 as the delta or difference between its finish time and its start time (values which are set by the player which played the chunk). Lastly, in order to adjust the playing time values in better accordance with actual processing time, the playing time is reset 607 by adding the delta just determined to the playing time and dividing by two (note that the division by two is merely an attempt to average out insignificant variations in actual play time).

If the chunk viewed in the queue 405 was not in a waiting state 407, not in a ready state 417, and not in a played state 601, referring still to FIG. 6, the chunk is then checked 609 for any error conditions or other anomalies/situations (e.g., flow control has thrown the chunk away, the chunk is too old, etc.). If the chunk has one of these error conditions/ anomalies/situations then 611 the playing time is divided by two (in an attempt to drive the playing time variable back towards its original values thus hopefully preventing future error conditions or problems). In all the above cases, the queues are next evaluated to determine whether all of the data chunks have been looked at and if so then the number of chunks still in a waiting state in the queues is determined 613 in order to get an idea of how much the queues are backing up. Then, 615 the number of data chunks in the waiting state in the queues is multiplied by the difference between the maximum time stamp and the minimum time stamp (to get an idea of how much variance exists in the various chunks still in the waiting state in the queues) and one percent (a variable chosen in one embodiment of the present invention to minimize the amount of adjustment to the clock) of that value is then added to the clock value 617.

Note that for each of the above possibilities where there are more chunks to be looked at, the result is to loop back to view/handle the next data chunk in the queue(s).

Referring now to FIG. 7, the Play Ready Task routine, which is the routine on the receive side which manages the playing of the various data chunks, will now be explained. First, the maximum time limit is checked 701 to ensure there is still available time to play data chunks. If the time limit has not been reached then the queues are examined 703 for data stream chunks in the ready state. If any chunks are found in the ready state then the data player for that type of data chunk is called 705 to play that ready chunk.

In the foregoing specification, the present invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. In a computer system having a central processing unit; an input unit for receiving a data stream associated with a data type, said data stream including a set of data segments, each data segment having a time stamp; and, an output unit, a data stream synchronization method comprising:

a) handling housekeeping chores of incoming data of said data stream to said input unit, said housekeeping chores handling step including the steps of:
   1) determining a processing time associated with a data player used to process said data type;
   2) reducing said time stamp for each data segment in said set of data segments by said processing time; and,
   3) placing each data segment in a queue;
  b) handling status of said data stream and adjusting a clock for said data stream with said central processing unit; and,
  c) utilizing said data stream with said output unit.

2. The data stream synchronization method of claim 1, wherein said queue is configured for holding data of said data type.

3. The data stream synchronization method of claim 1, wherein said placing step includes the step of assigning a wait state to each data segment.

4. The data stream synchronization method of claim 1, wherein said status handling step comprises the steps of:

determining a minimum time and a maximum time of each data segment in said queue;

adding an amount of time equal to an elapsed time since said status handling step was last invoked to an idle time period;

examining each data segment to determine a particular state assigned to each data segment; and, processing each data segment in accordance with said particular state.

5. The data stream synchronization method of claim 4, wherein said particular state is a waiting state and said processing step comprises the steps of:

comparing an idle time period to an idle time threshold;

resetting a clock to a current time if said idle time is greater than said idle time threshold;

resetting said idle time period to zero;

comparing a first data segment time stamp of a first data segment of said set of data segments with said clock; and, assigning a ready state to said first data segment and noting a time when said first data segment was assigned said ready state if said first data segment time stamp is less than or equal to said clock.

6. The data stream synchronization method of claim 5, further comprising the steps of:

comparing a discard time threshold to a difference between said first data segment time stamp and said clock time; and, assigning a discard state to said first data segment if said difference is greater than said discard time threshold.

7. The data stream synchronization method of claim 6, further comprising the steps of:

comparing said first data segment time stamp with said clock; and;

if said first data segment time stamp is less than said clock, setting said clock in accordance to the following formula:

new clock time=old clock time−((old clock time−data segment time stamp)×adjustment factor).

8. The data stream synchronization method of claim 4, wherein said particular state is a ready state and said processing step comprises the steps of:

comparing a first data segment time stamp of a first data segment of said set of data segments with twice the value of a discard time threshold; and, assigning a discard state to said first data segment if said first data segment time stamp is greater than or equal to two times the value of said discard time threshold.

9. The data stream synchronization method of claim 4, wherein said particular state is a played state and said processing step comprises the steps of:

removing a first data segment of said set of data segments from said queue;

calculating a play duration value according to the following formula:

play duration=(finish time−start time);

and, resetting the playing time according to the following formula:

new playing time=((old playing time+play duration)/2).

10. The data stream synchronization method of claim 4, further including the steps of:

checking a first data segment of said set of data segments for an error condition; and dividing a playing time by two if said first data segment contains an error condition.

11. The data stream synchronization method of claim 4, further including the steps of:

examining said queue to determining a number of data segments which are in a waiting state;

multiplying said number with the difference between said maximum time and said minimum time; and, adding 1/100th of said number to said clock.

12. The data stream synchronization method of claim 1, wherein said data stream utilizing step comprises the steps of:

checking for a maximum time limit; and, examining said queue for any data segments having a ready state and processing those data segments using said data player if said maximum time limit has not been reached.

13. In a computer system having a central processing unit; an input unit for receiving a data stream associated with a data type, said data stream including a set of data segments, each data segment having a time stamp; and an output unit, a data stream synchronization apparatus comprising:

a) means for handling housekeeping chores of incoming data of said data stream to said input unit, said housekeeping chores handling means having:

1) means for determining a processing time associated with a data player used to process said data type;

2) means for reducing said time stamp for each data segment in said set of data segments by said processing time; and, 3) means for placing each data segment in a queue;

b) means for handling status of said data stream and for adjusting a clock for said data stream with said central processing unit; and, c) means for utilizing said data stream with said output unit.

14. An apparatus comprising:

a processor;

a memory coupled to said processor;

an input unit coupled to said processor, said input unit receiving a data stream associated with a data type, said data stream including a set of data segments, each data segment having a time stamp;

an output unit coupled to said processor;

said memory configured to cause said processor to:

a) handle housekeeping chores of incoming data of said data stream to said input unit, said housekeeping chores handling step includes the steps of:

1) determining a processing time associated with a data player used to process said data type;

2) reducing said time stamp for each data segment in said set of data segments by said processing time; and, 3) placing each data segment in a queue;

b) handle status of said data stream data and adjusting a clock for said data stream with said central processing unit; and, c) utilize said data stream data with said output unit.

* * * * *